United States Patent [19]
Garbuny

[11] 3,788,742
[45] Jan. 29, 1974

[54] GAS MONITORING SYSTEM
[75] Inventor: Max Garbuny, Pittsburgh, Pa.
[73] Assignee: Westinghouse Electric Corporation, Pittsburgh, Pa.
[22] Filed: June 24, 1971
[21] Appl. No.: 156,331

[52] U.S. Cl. .................... 356/5, 356/103, 356/207, 356/218
[51] Int. Cl. .......................................... G01n 21/00
[58] Field of Search ... 356/103, 104, 205, 207, 208; 250/218

[56] References Cited
UNITED STATES PATENTS
3,517,190   6/1970   Astheimer .......................... 356/207
3,519,354   7/1970   Brown, Jr. et al. ................. 250/218
3,653,767   4/1972   Liskowitz ........................... 250/218
3,612,688   10/1971  Liskowitz ........................... 250/218

Primary Examiner—Maynard R. Wilbur
Assistant Examiner—S. C. Buczinski
Attorney, Agent, or Firm—D. C. Abeles

[57] ABSTRACT

A monochromatic laser beam tuned to a wavelength which coincides with one of the natural absorption lines of the gas molecular species to be detected is directed towards the gas medium being monitored. A remotely located receiver positioned in proximity to or near the laser system, views the radiated region of the monitored gas in two spectral regions; one in the absorption band and the other on either side of the absorption band. The receiver develops signals from the backscattered irradiation in the time and frequency domain to determine the presence and measure the density, depth and range of the molecular species being detected in the illuminated cross section of the monitored gas. A second method employed by this invention utilizes the polarization characteristics of the backscattered radiation, incurred from processes such as resonant imprisonment in the monitored gas, to determine the presence of the molecular species being detected.

10 Claims, 12 Drawing Figures

GAS MONITORING SYSTEM

BACKGROUND OF THE INVENTION

The present invention relates to a method for determining the presence, density, range and depth of a particular molecular species in a gas distribution. More particularly, the invention relates to a method for obtaining measured values from which these quantities can be determined.

The potential of pollution monitoring systems employing laser beam scattering by atmospheric contaminants or poisons has recently received widespread attention in industry and government. Such systems operate remotely and in real time by directing pulses (or continuous waves) of a laser beam toward the effluent from smoke stacks, vehicles, etc., or toward a larger volume of the atmosphere and observe with suitable sensors the intensity of the radiation which is scattered back. In principle, this process is capable of enormous background discrimination so that day or night operation is possible with almost the same signal to noise ratio. Such LIDAR systems have already been used experimentally to detect smoke over stacks at distances of 15 kilometers. Examples of such systems are described in the R. W. Astheimer U.S. Pat. No. 3,517,190, entitled "Method of Remotely Monitoring Stack Effluent," patented June 23, 1970 and the L. W. Carrier U.S. Pat. No. 3,499,159, entitled "Polychromatic Laser Aerosol Sizing And Ranging Technique," patented Mar. 3, 1970. Various options among the processes of light scattering also exists for the determination of gaseous contaminants. While most processes are applicable in feasible systems, resonance scattering or, at least, near resonance scattering is by far the most attractive solution. Resonance scattering, in fact, has a cross section (effectiveness) of scattering which is by a large factor (typically $10^{10}$) greater than the method at present preferred (Raman scattering). At 10 kilometer distance, the information available from resonance scattering with moderate optical equipment is sufficient to measure a contaminant density of 0.01 parts per million with 1 percent accuracy by observing the return of a 1 Joule laser pulse from 4 meter scattering path. On the other hand, the observation of Raman scattering, with $10^{10}$ times smaller sensitivity, has only the capability of determining, from 100 meter distance 1 part per million with 10 percent accuracy with optical equipment 100 times larger in receiving area.

However, Raman scattering, has, in a different respect, two advantages over resonance methods. First, the molecular spectra of all atmospheric components appear simultaneously in the spectrum of the scattered radiation as satellite (Stokes) lines around the unshifted (Rayleigh) line which can be chosen arbitrarily. In contrast, resonance can be probed only at specific wavelengths (resonance being defined as the coincidence of any frequency with a spectral line at which a medium shows absorption at normal temperature and pressure, although in some cases quenching may greatly reduce the efficiency of reradiation). This fact has been a strong deterrent against the use of resonance scattering of laser beams since the prospects of finding lasers oscillating at the desired resonance lines appeared dim. During recent years, however, the state of the art has progressed to lasers which are tunable over the entire visible and near infrared spectrum, and this by three different devices: (1) organic dye lasers which can be continuously tuned, e.g., by first order grating diffraction by varying angles; (2) parametric oscillators which can be tuned continuously by temperature or angle; and (3) the stimulated Raman effect (in a transmitter mode) produced in a set of selected media in combination with a suitable laser, which can be used to generate the resonance lines of all the gaseous components which are of interest. Thus, the problem of matching the laser to all pollutants is now solved.

There exists, however, a second disadvantage of the resonance method, and it is that to which this invention addresses itself. When scattering is very weak, as in the Raman case, the contribution from individual molecules simply add; the dynamic measuring range is very large (single, independent scattering). In resonance scattering, interactions are so strong that radiation becomes trapped, unless molecular densities are very small. Specifically, a laser pulse will be instantaneously scattered towards the observer only from the layers of initial penetration. Light reaching deeper layers will undergo many processes of absorption and reemission until it is, after a relatively long time, scattered out of the volume of gas (so-called resonance imprisonment). The point is that (excluding quenching processes which sometimes occur) all the radiation is scattered. The dynamic range is thus very small; molecular densities, from small values upward, yield the same saturation intensity.

The Astheimer patent, cited above, utilizes the principles entailed in Raman scattering to determine the concentration of pollutant gases in a smoke plume with the associative disadvantages encountered with the Raman technique.

The Carrier patent, limits itself to a polychromatic laser beam which is directed towards an aerosol to determine the particle size distribution and the range of the aerosol. Aerosols are defined as solid or liquid particulates such as particles of smoke, smog, fog, or dust, of such size as to remain suspended in the air over long periods. In the Carrier patent the receiver must be positioned within a right angle plane of the radiated laser beam. The resultant polarization of the incoming light through the receiver is used to determine the particle size distribution and range of the aerosol. This method is strictly limited to aerosols and is not effective to determine the molecular distribution of a gas.

Thus, it is the object of this invention to provide a method that utilizes the detailed processes occuring in resonance imprisonment as a means of distinguishing between various molecular densities so that they can be measured over a large dynamic range.

More particularly, it is a further object of this invention, to provide such a method that will determine remotely and in real time the presence, density, depth, and range of a particular molecular constituent of the gas to be monitored.

It is a further object of this invention to provide values from which such measurements can be obtained using relative intensity methods, regardless of the optical resolution of the observed volume and the intervening attenuation and without reference to the intensity of the incident laser beam.

SUMMARY OF THE INVENTION

This invention employs the detailed processes occurring in resonance imprisonment as a means of distinguishing between various gaseous molecular densities so that they can be measured over a large dynamic range. Certain other advantages will result from this principle as will be shown in the description of the preferred embodiment presented hereinafter.

The spectral width of the laser is very narrow, or can be made very narrow compared to the spectral profile of the molecular line. The term "molecular line" being defined as encompassing transitions in atomic as well as in molecular spectra. Therefore, all references to the detection of molecules within a gas distribution should be understood to include atoms as well. The width of the molecular spectral profile from atmospheric constituents is due mainly to collision broadening. In a single scattering process, the reradiated light has essentially the same frequency as the laser. Thus, it can be expected that the light scattered from the layer of initial penetration has still essentially the same spectral profile as the laser radiation. However, the light from deeper layers of penetration of the primary beam undergoes many capture and reemission processes due to electron transitions of the resonant molecules. During each process (depending on its duration compared to the period the molecule is free from perturbation), there takes place a certain average amount of detuning of the original frequency of the laser. The reemitted light is therefore quite broadened. Under the following simplified assumptions it is possible to assess the effect of various densities, one of which is that an individual scattering process has a duration so short that perturbations have only a small effect. If the density of the atmospheric component is very small (single scattering), the scattered radiation has substantially the profile of the incident laser beam (assuming there is no vibrational-rotational relaxation). For densities large enough for the onset of resonance imprisonment, the light undergoes several capture processes and the scattered light begins to be broadened. For high densities, the scattered radiation approaches the molecular spectral line shape.

It will be seen from the descriptive exemplary embodiment that the ratio of scattered light with frequencies in the wings of the spectral molecular line to that in a narrow interval around the laser frequency is a measure of the density of the contaminant gas. It is an object of this invention to provide means for such ratio measurement. Measurement of the ratio has the additional advantage, that unlike other remote monitoring methods, it does not require knowledge of the absolute power which the medium receives from the laser. Thus, it is not necessary to resolve the shape and size of the target medium by large telescopes for greater distances. In other words, the volume element can be analyzed, although it appears as a point source.

In one embodiment of this invention the gas to be monitored is irradiated with a monochromatic laser of a radiation having a wavelength which coincides with one of the natural absorption lines of the gas molecular species to be monitored. The backscatterd light is observed through two filters which may be adjacent to each other and within proximity of the laser source or share the incident power by means of a beam splitter. One filter transmits only the line portion outside of the center; the other only the portion near the center. The ratio of the signals received through the two filters is then a measure of the gas density.

Simultaneously, the intensity of the received signal versus time is plotted and the resultant curve is a measure of the density of the gas molecular species under investigation present in the monitored gas and the depth of that gas along the axis of the incident laser beam. Furthermore, the range of the gas under investigation can be determined from the time delay between the emitted laser signal and the receivers encounter of the received backscattered radiation. Correlation of the frequency and time signals yields information as to the presence, density, range and depth of the molecular species being investigated.

An alternative method contemplated by this invention uses the depolarization that occurs in resonance imprisonment. A laser beam is pointed towards the resonant medium in the $z$ direction, linearly polarized in the $x$ direction. The backscattered light is observed by two adjacent receivers admitting only the $x$ and $y$ component, respectively. The ratio of the corresponding intensities, the depolarization $I_y/I_x$ reveals information on the monitored volume of gas under detection. If the resonance corresponds to a vibrational-rotational line of a molecule, typically in the infrared region, depolarization is almost complete (i.e., $I_y/I_x \approx 1$) for all but very small densities. The depolarization may, therefore, serve by itself in the infrared region as a means of discriminating against echoes from aerosols or surfaces which produce much less, if any, depolarization. On the other hand, if the resonance corresponds to the electronic transition of a single atom, typically in the ultraviolet or visible region, the individual scattering process occurs so fast that the atom has little probability of depolarization. Only a succession of scattering processes such as occur in resonance imprisonment will cumulatively build-up a correspondingly large depolarization. Thus, for such transitions, the ratio $I_y/I_x$ can be used as a measure of density. Between these two extremes, there exist intermediate conditions, such as electronic transitions of molecules, for which the depolarization methods can be used to aid in the diagnostic process taught by this invention.

The method thus described can be combined with that of frequency discrimination, e.g., by placing $x$ and $y$ polarizers in front of the second and first receivers, respectively. On the other hand, used alone, the polarization method has the advantage of employing receivers insensitive to the frequency of the molecular resonance lines.

The methods thus described, using monochromatic laser beam scattering, provide means to identify and quantitatively determine, remotely and in real time, the molecular constituency of a gas over a large range of concentrations.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENTS

The growing concern with air pollution has created a need for the development of monitoring systems with capabilities far exceeding those of the methods and equipment now in use. The observance of present standards requires real time, remote monitoring of gaseous and particulate effluents pinpointed over industrial smokestacks, behind vehicle exhaust, and the like as well as of larger volumes of pollution over a specific area. The monitoring system contemplated by this invention provides qualitative and quantitative data to determine not only the nature of various pollutants (such as $SO_2$, NO, CO, etc.) but, in addition, their densities with some specified accuracy and is operable day and night in a manual and automatic scanning mode so that large areas may be supervised from a single vantage point.

No single system now in use fulfills even a few, let alone all, of these requirements. For example, chemical analyzers evaluate air quality only at select locations, usually remote from the source of pollution, and only for specific contaminants. Again, systems measuring the spectral transmittance of the air over a selected path determine only an average concentration of a specific gas.

Figure 1:
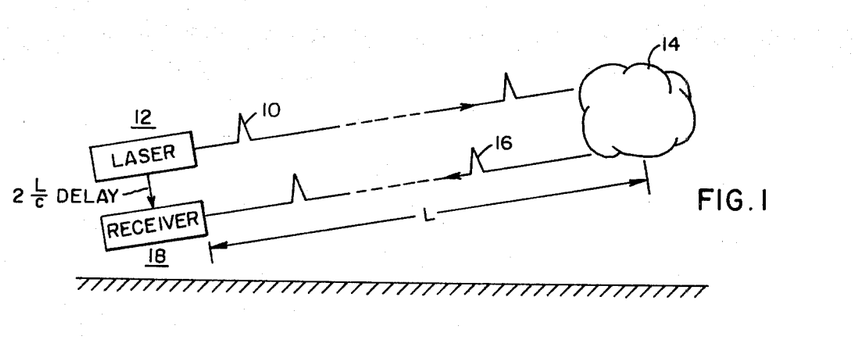
FIG. 1 is a schematic illustration showing the laser transmitter and receiver used to practice the method of this invention.

Recent advances in lasers and especially in the manipulation of laser beams now make possible the monitoring method contemplated by this invention and illustrated schematically in FIG. 1. A laser beam 10 (either continuous wave or pulse as shown) is directed towards the specific volume element 14 under investigation. The optical frequency of the laser beam is tuned, and may be tuned in succession, to the resonances of the gases of interest. The presence and amount of gaseous contaminants, reveals itself in response to the incident resonant laser frequency as an echo 16 (by light scattered back from the medium to a receiver 18 adjacent the laser transmitter 12). Furthermore, a non-resonant echo is received from any smoke or aerosol. The time of flight for a laser pulse 10 to and from the volume element 14 is an accurate measure of the range of the volume element 14 from the source 12. The time, T, of flight for a pulse to and from a target volume at a distance L (in meters) is given by $T = 2L/c$ where $c$ is the speed of light, $3 \times 10^8$ meters/second. A requirement for accurate ranging is that the rise time (i.e., time of onset) of the echo is small compared to T. Alternatively, the distance to the source 12 will be known so that the sensor in the receiver 18 can be gated, i.e., made responsive only during the short time intervals when the echo is expected, so that only the light from the scattered volume in question will be accepted. As the following exemplary embodiment will show, this type of monitoring system provides the advantages of real time, remote operation during day or night and may be operated in an automatic scanning mode.

As a coherent source (i.e., ideally, as a single oscillator, the laser exhibits beam directionality with its concomitant power, collimation, phase and frequency coherence in time and space. These properties are, of course, common to all single oscillator radiators, the best known example being the microwave transmitter; but the advantage to be gained from coherence increases in proportion to the operating frequency, that is to say, by a factor in the order of $10^4$ in favor of lasers over microwaves. Thus the divergence of a laser beam is typically in the order of 0.1 to 1 milliradians corresponding to a spread radius of 10 centimeters to 1 meter at a distance of 1 kilometer. Combined with the high phase and frequency definition of the laser, which can be used for noise suppression by such means as hymodyning and spectral filtering, these facts point to the great potential of the method taught by this invention.

The capabilities of the laser are further augmented by a variety of controls and types of operation. Most important among these are Q-switching in which the input power is stored for a certain duty cycle and then released in a very short time interval, typically in the order of $10^{-8}$ seconds. Related developments make it possible to release such energy bursts in even shorter time intervals, and release times shorter than $10^{-12}$ seconds have been attained in the art. Two advantages of these capabilities are pertinent here. First, the instantaneous power of the laser beam is very high; it is, for example, $10^7$ watts per 100 millijoule pulse release in $10^{-8}$ seconds. Thus, if a receiver admits backscattered radiation only in a short time interval bracketed around the time of signal arrival, very high enhancement of clutter rejection and signal-to-noise ratio will result. A specialized use of the high instantaneous power capability is the excitation of fluorescence in gases in transitions not encountered with conventional light intensities.

The scattering of laser light from various media manifests itself in an enormous number of detail phenomena which are significant, in fact, decisive for the suitability of such processes in terms of pollution monitoring. The most effective identification of gaseous pollutants and measurements of their densities is accomplished by means of resonance scattering.

The interaction of the laser beam with a gaseous medium can be understood on the basis of the following considerations. Every gas has throughout the electromagnetic spectrum certain more or less narrow spectral regions of absorption which are called absorption lines. These absorptions are caused by energy transitions of the molecule from an existing state to a higher state. Absorption lines in the ultraviolet and visible region correpond mostly to the larger transitions in electron energy. In monatomic gases, such as the vapor of mercury, these lines are fairly isolated. In gases consisting of molecules with two or more atoms, the transitions of electrons are coupled with the lower energy transitions of vibrational and rotational energy, giving rise to many lines grouped in bands. The same vibrational-rotational transitions give rise by themselves to bands in the infrared region. In the following, the pertinent spectral properties of these absorption lines will be discussed, it being understood that there may be only a few or many lines of sufficient intensity to be of interest.

Figure 4A:
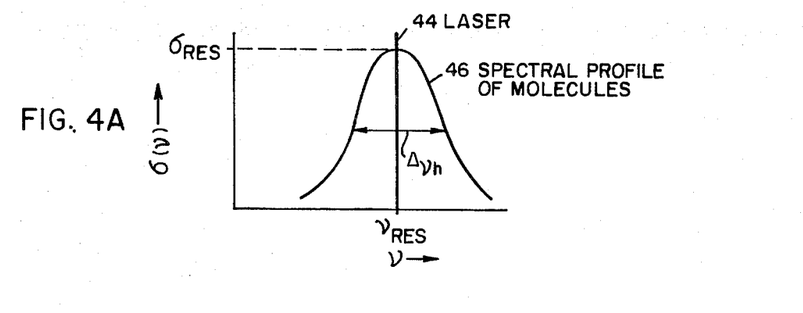
FIGS. 4A, B, C and D are graphical illustrations showing the received spectral profile representative of various densities of a particular molecular species being detected.
Figure 4B:
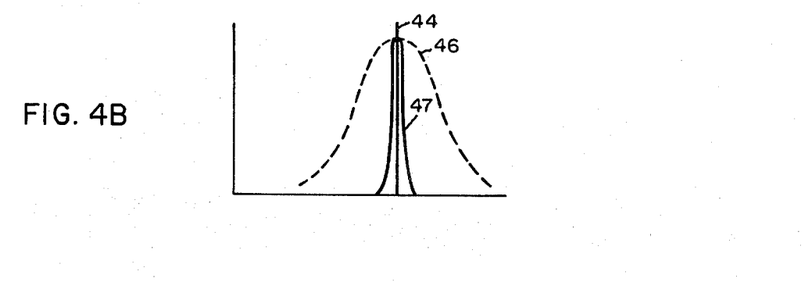

The fraction of light intensity, defined as light power per unit area, absorbed by a single molecule, viz. $I_{abs}/I_o$, is called the cross section for absorption $\sigma(\nu)$ which depends on frequency $\nu$ as shown in FIG. 4, curve A. The spectral profile has a half width $\Delta\nu_h$, which depends on a number of physical parameters, but is in the gases of the normal atmosphere determined mainly by collisional broadening. The bandwidth of laser light 44 is in general much narrower than this width so that one can consider laser light at frequency $\nu$ as monochromatic in comparison with width $\Delta\nu_h$. Assume such laser radiation to be incident on a gas of density $n$, i.e., $n$ molecules per cm³. If $\nu$ is sufficiently close to the center of the absorption line, absorption will become strong. Thus, the intensity $I_o$ of the laser beam will be attenuated over a path length $z$ to $I_o e^{-\sigma(\nu)nz}$ where, of course, $nz$ is the number of molecules encountered per unit area. The radiation energy absorbed can be transformed, in principle, into other forms of energy, notably heat. However, for purposes of this description, it is sufficient to assume that all of the energy is reradiated at or near the frequency $\nu$ more or less into all directions by a process called "scattering". Over a path length $z$, therefore, the fraction of intensity $I_{sc}$ scattered equals:

$$I_{sc}/I_o = 1 - e^{-\sigma(\nu)nz} \quad (1)$$

The exponent $\sigma(\nu) nz$ is a measure of optical density. Two limiting cases must now be considered:
For $\sigma(\nu) nz \ll 1$, $$I_{sc}/I_o = \sigma(\nu) nz \quad (2)$$

In this limit, the scattering processes by the individual molecules are simply additive. This limit, therefore, will be referred to as "single scattering." Under the conditions for which Equation (2) is valid, the product $nz$ can be determined by measuring the ratio of backscattered intensity to the laser intensity. This presumes that the following are known: from previous measurements, the laser intensity at the medium, possibly in the presence of atmospheric attenuation, and the fraction of light scattered back into the receiver. The condition of single scattering is however a severe limitation. For example, for $z = 10^3$ cm and $\sigma$ res $= 10^{-17}$ cm² (typical of many resonance lines), the condition is only fulfilled for densities less than about $3 \times 10^{13}$ molecules/cm³ corresponding to a concentration of one part per million in the atmosphere. The validity range may be extended by tuning the laser to a frequency $\nu$ for which $\sigma(\nu)$ has an appropriately smaller value, but a limit to this procedure is posed by the fact $\sigma(\nu)$ may not be known under varying atmospheric conditions so far away on the wings of the molecular line and contributions from other lines of other species may occur which cannot be corrected for.
For $\sigma(\nu) nz \gg 1$ $$I_{sc} = I_o \quad (3)$$

Figure 9:
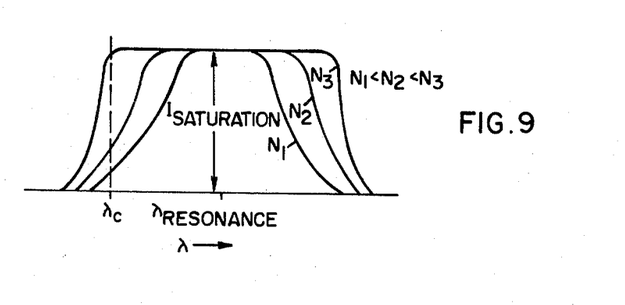
FIG. 9 is a graphical illustration representative of the spectral profile received from a detuned incident laser beam for various molecular densities.

In this limit, all of the incident radiation is scattered out of the volume. The signal scattered back to the receiver is thus saturated and insensitive to variations in density $n$ or path length $z$. Thus if in the preceding example the concentration is raised to 10 ppm, the backscattered radiation has reached 95 percent, and at 100 ppm 99.75 percent, of its saturation value. It is again possible to arrive at $nz$ ($N = nz$) by detuning from resonance as illustrated by the graph in FIG. 9. In this case, the measurement is more convenient and more reliable. The observation of a fall-off from saturation of the received signal involves only relative intensities, i.e., a comparison of signal values in arbitrary units, without reference to the absolute laser beam intensity incident on the medium. For example, according to Equation (1), if by detuning to a frequency $\nu$ a signal is reduced from the saturation value by a factor $(1 - 1/e) = 0.63$, then $nz = 1/\sigma(\nu)$. Since in this measurement relatively large values are involved, the result is more reliable than in the detuning procedure near the single scattering limit. Thus, a measurement of density can be obtained by detuning the laser to a frequency that causes the received signal to be reduced to a set value such as 0.63. In this case the detuned frequency is a measure of density. The difference between the detuned frequency $\lambda_c$ and the resonance frequency $\lambda$ resonance $(\lambda_{res} - \lambda_c)$ can then be compared to a precalculated graphical standard to determine a measure of density which is dependent on the depth $z$.

It will be apparent from the preceding, that by measuring the intensity of the echo returned in response to laser radiation at varying frequencies, the product of molecular density $n$ and depth $z$ of a gas layer can be determined. As pointed out before, $nz$ is the total number N of molecules in a cylindrical volume of unit area and length $z$; hence it makes accessible a measure of total number of molecules in a gas cloud whose extent and density distribution can be established.

For many purposes, however, it is desirable to establish density and depth separately. It is also desirable to establish alternative simpler methods to measure the product $nz$. The possibility of accomplishing these objectives arises in fact from the processes by which the saturation of the signal establishes itself.

Assume that a well defined pulse of highly coherent laser radiation is incident on a medium. More specifically, we assume in the laser pulse a very narrow frequency width commensurate with short duration and well defined polarization and directionality of the beam. This high degree of coherence, or order, in time, frequency, polarization, and directionality is degraded when the beam enters a gaseous medium. Furthermore, the degree of the resulting disorder, or deviation from the initial coherence, increases with the density of the gas and length of beam path. However, the various parameters of coherence, such as the definitions of frequency, polarization, pulse shape (impulse response), do not, or do not at all, depend on the product of density as a single variable. It is, therefore, a further objective of this invention to use the degree of disorder as a measure of density and path length $z$ separately.

Specifically, the various processes leading to disorder are the following. The incident resonant light wave produces electronic or ionic oscillations which, in turn, generate the secondary or scattered waves. At very low gas densities, the molecules are far enough apart so that the individual oscillations are not disturbed by collisions during the oscillation process and the scattered light is not reabsorbed by other molecules of the same species. As the gas density is increased, two types of perturbations occur. The probability that the oscillation is disturbed during its process by collisions is enhanced. Second, the scattered radiation from a first molecule is reabsorbed by a second molecule, and this process of emission and reabsorption may be repeated a large number of times, the phenomenon being known as resonance imprisonment. During each of the individual absorption and reemission events, disturbances by collision can occur. The disturbances are of various kinds, but each tends to randomize the original, highly ordered state of the radiation. First the frequency will be broadened due to the collisions (an effect in the atmosphere much larger than Doppler broadening). Second, there is a strong effect on the response time of scattering. The main effect is that the oscillation time is multiplied by the number of individual emission and absorption processes. A related effect, which may occur under certain conditions, is that the energy of excitation is interchanged between molecules by collisions, rather than radiation leading to another type of radiation trapping. A partially compensating effect is that the oscillation time is shortened by collisions. This latter effect will obviously be small, if the resonant gas has a small concentration in air since the collisional lifetime of the oscillations is largely determined by the density of air molecules so that the main result is radiation delay by trapping. Third, the original polarization of the oscillation which follows that of the laser light is disturbed by each collision so that finally no memory of the original polarization is maintained. This effect is more important in monatomic gases than in polyatomic molecules which may depolarize spontaneously because of rotation. Finally, the density of the resonant molecules has an effect on the spreading of the beam. For low densities, the beam will be more or less confined to a conical volume; at intermediate densities, the radiation will spread through large parts of the gas cloud; at sufficiently large densities, the beam substantially penetrates only a small thickness of gas and the backscattering process resembles diffuse reflection. In principle, all these detail affects which lead to the saturation of the scattering signal discussed before, lend themselves to means for the determination of gas density and depth.

Resonance scattering is thus defined as the secondary light emission from a gas in response to radiation of a wavelength substantially coinciding with one of the natural absorption lines of the gas. The response of a gas to a specific wavelength of the incident radiation by resonance scattering, therefore, is a highly sensitive indicator of its identity. As previously described, lasers, as coherent atomic oscillators, themselves emit sharp lines. For a coincidence with the absorption lines of the monitored gases, tuning is necessary. In contrast, scattering from particulates is nonselective, varying only slowly with wavelength in a manner depending on the size and composition of the particles.

Thus, in accordance with the method taught by this invention, the laser tuning system is switched successively from one frequency position to the next, each position locked on the resonance line of a specific gas to be monitored. In addition, means of fine-tuning should be provided so that the spectral profile of the echo as well as scattering from particulates can be determined for various wavelength regions. An exemplary received spectral profile identifying three molecular species in a gas distribution may be found by reference to FIG. 2. In a second method, taught by this invention, the frequency of the laser oscillator system is swept continuously over a large spectral interval, e.g., from 2 to 10 microns. In either method, the backscattered radiation can be measured as a function of frequency and time to identify the various contaminant gases and to detect particulates of various sizes.

The determination of density requires further provisions. As previously described, the intensity of the resonance scattered light is proportional to the concentration of the scatterer only for low densities. Typically, this region of linearity is limited to concentrations of up to 0.1 ppm which, under certain standard conditions, including observation from 1 kilometer distance, can be determined with an accuracy of 1 percent. As the density increases, the intensity of the backscattered light grows with it less than linearly and finally reaches a saturation limit so that higher densities fail to produce an increase in signal. The accurate determination of pollutant gas densities above such limits, of course, constitutes an important requirement of any monitoring system. The origin of the nonlinearity and saturation behavior of the scattered intensity is the departure from single scattering at higher densities. The incident light, instead of being absorbed and reemited from the gas in a single step experiences a large number of capture and release processes giving rise to the phenomenon of resonance imprisonment. The methods of this invention utilize the effects of the dynamic processes in resonance imprisonment of the properties of the scattered light for determining gas densities. These effects and the system components necessary to measure them are described in detail hereinafter. The methods of this invention have in common that they evaluate relative, rather than absolute, intensities of the scattered light. This has the advantage that the laser energy per pulse does not have to be known and that the image of the scattering volume as observed by the sensor (receiver) does not have to be resolved (point source projection).

Departures from single scattering are less important for determining particulate densities compared with resonance imprisonment by gaseous media. The spectral intensity distribution of the backscattered continuum, probed over a large enough interval of wavelengths, yields a satisfactory dynamic range for measuring the concentrations and particulate sizes as have been illustrated in the aforementioned Carrier and Astheimer patents.

Figure 5:
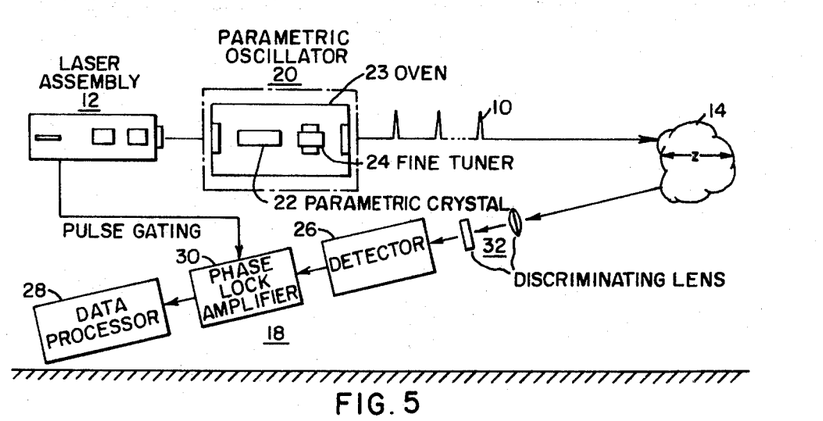
FIG. 5 is a schematic diagram illustrating the laser transmitting and receiving assembly used to practice this invention.

The exemplary system used to practice this invention is shown schematically in FIG. 5 and employs components which are well within the present state of the art. The transmitter subsystem utilizes a laser assembly 12 and a parametric tunable oscillator 20, all of which are commercially available components. Other tunable lasers are commercially available, such as the tunable dye laser, and may be employed in the transmitter subsystem of this invention. The exemplary laser assembly 12, illustrated in this embodiment, contains a flashlamp-pumped neodymium laser, acoustic Q-switch, and frequency doubler as its main components. The assembly 12, exemplary of this invention, emits pulses of light at a given repetition rate of a selected frequency near 0.5 microns. The parametric oscillator 20 is a cavity containing the nonlinear parametric crystal 22 for coarse tuning by changing the index of refraction by temperature or angular orientation and an electro-optic crystal 24 for fine tuning, all in colinear arrangement. In one exemplary embodiment, the parametric oscillator is surrounded by a small stabilized oven 23, and coarse tuning is accomplished by varying the temperature of the parametric crystal 22. In one method of operation as described, the oscillator is coarse tuned successively to the resonance of the various gases being detected. At each resonance point (the frequency of the natural absorption line of the molecular species being detected), fine tuning sweeps over the immediate neighborhood of the spectral resonance profile. The radiation backscattered from the gas mixture 14 is observed with a receiver subsystem 18 comprising a collecting lens (or mirror) 26, phase locked amplifier 30, and data processor and recorder 28. For most operations, a discriminator 32, which will be discussed later, is needed in front of the detector 26. The amplifier 30 is phase locked to the pulse sequence of the laser system to obtain maximum signal-to-noise ratio and, if needed, can be used for remote monitoring to define the location in the gas from which the scattered radiation is accepted by the delay time $2L/c$; where $L$ is the distance from the source to the monitored gas volume and $c$ is the speed of light as illustrated in FIG. 1.

Of course, it should be understood that the system just described is only exemplary of one such system which may be used to practice this invention. For example, for each of the gaseous molecular species to be detected, a separate parametric oscillator can be provided which is pretuned by temperature to the respective resonances. The operation of the system requires only a laser beam deflection by mirror to the various cavities and successive fine tuning around the scattering profiles by electro-optical means which in an automatic mode may consume only about a second. A second high-speed alternative is called angle-tuning and involves a slight variation in angle of the beam or oscillator crystal.

Figure 2:
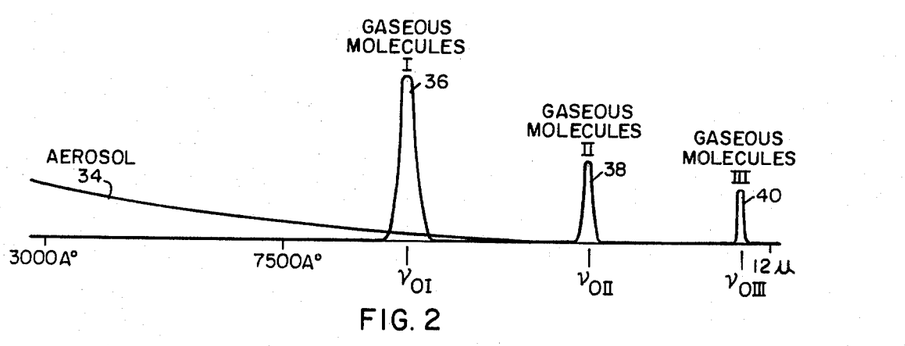
FIG. 2 is a graphical illustration showing the natural absorption frequency lines of three gaseous molecular species to be detected.

According to one method of operation contemplated by this invention, the laser source 12 is tuned by the parametric oscillator 20 to one of the natural absorption lines of the gaseous molecular species to be detected. A pulse transmitted laser waveform 10 is illustrated in FIG. 5, however, it is to be understood that this is not a requirement of the invention and the transmitted waveform can be provided in a continuous mode. The laser transmitted pulse is then fine tuned around the natural absorption line of the particular molecular species being investigated. The received backscattered radiation observed by the detector 26 and data processor 28 is then viewed in the frequency domain. If the gaseous molecular species being monitored, in this exemplary illustration labelled gaseous molecular species No. 1 (reference character 36 in FIG. 2) is present, then a sharp peak in the received waveform will be observed. Such a waveform may be found by reference to FIG. 2. Note, that the received waveform from the backscattered radiation reemitted from the molecular species under detection decays rapidly in an exponential manner as the laser is detuned around the natural absorption line of that particular molecular species. This waveform may be contrasted with the waveform observed from the backscattered radiation reemitted from the particulates in an aerosol. The intensity of the backscattered radiation from an aerosol does not decay as rapidly as that from a particular gaseous molecular species as the laser source is detuned as illustrated in FIG. 2 by reference character 34. Therefore, a received peak 36 substantially centered around the natural absorption line of the gaseous molecular species under investigation will indicate the presence of that gaseous molecular species within the volume element 14 being monitored. By tuning the laser to subsequent absorption lines of other gaseous molecular species under detection various other peaks 38 and 40 will be detected indicating the presence of other gaseous molecular species within the volume 14. By correlating these frequencies to the natural absorption lines of different gases it is possible to identify the presence of these particular gases within the volume 14.

Figure 3:
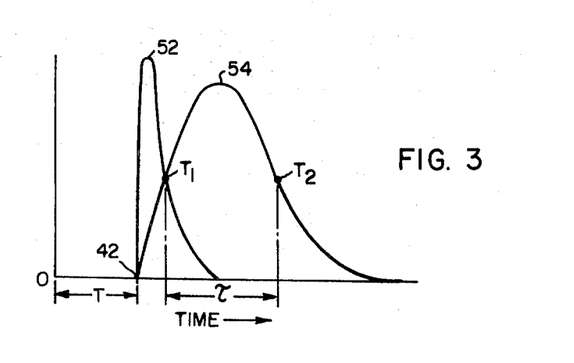
FIG. 3 is a graphical illustration showing the intensity of the received backscattered radiation versus time.

The detector 26 is phase locked to the laser assembly 12 by phase lock amplifier 30 so that the detector 26 can selectively view the backscattered radiation emitted from each of the incident pulses 10. The data processor 28 plots the intensity of the incoming signal versus time, as illustrated in FIG. 3, as well as plotting the frequency profile of the incoming signal as illustrated in FIGS. 4A, B, C and D. FIG. 3 is a graphical representation of the intensity of the incoming backscattered signal versus time for a particular molecular gaseous species being detected. Thus, after the presence of a particular gaseous species is determined in the volume 14, the incoming signal (backscattered from the incident resonant signal tuned to the natural absorption line of that particular molecular gaseous species) is monitored in the time domain and the resulting signal as illustrated in FIG. 3 will be a function of the density and depth of that particular molecular species within the gaseous medium 14. The delay time between zero (the time of emission of the incident laser pulse) and the first received signal designated by coordinate 42 on the abscissa is a measure of the range, $2L/c$ of the gaseous volume 14; $L$ being the distance from the laser source to the gaseous species; and $c$ being the speed of light. For low densities and smaller volumes of gas, where resonant imprisonment does not occur to any large degree, the pulse-time profile 52 in FIG. 3 will bear only a slight distortion from the original incident laser pulse. For larger densities and volumes where resonant imprisonment becomes a dominant process, the curve will saturate as illustrated by reference character 54 in FIG. 3 and be a function of the depth and density of the particular molecular species within the volume of gas 14 along the axis of the incident radiation. Under the latter conditions, the pulse-time profile is considerably broadened. Thus, a characteristic time parameter, such as the interval between half-maximum intensity points $T_1$ and $T_2$ ($\tau = T_2 - T_1$) depicted in FIG. 3, is a measure of density and depth. The measurement may be obtained by comparing the received signal with a precalculated graphical standard. Obviously, instead of recording the entire pulse-time profile, the data processor 28 may simply record the time interval during which the echo pulse exceeds a certain fraction of the maximum intensity.

This time inverval will then establish a degree of pollution which can be known from previous calibration of the instrument. It should be noted that a received backscattered signal from an incident resonant laser pulse is also an indication of the identity of the molecular species monitored within the gas distribution.

Figure 4C:
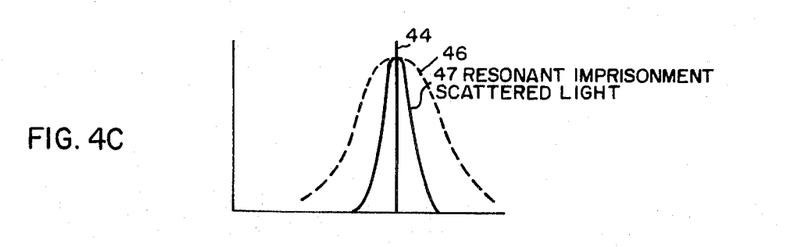
Figure 4D:
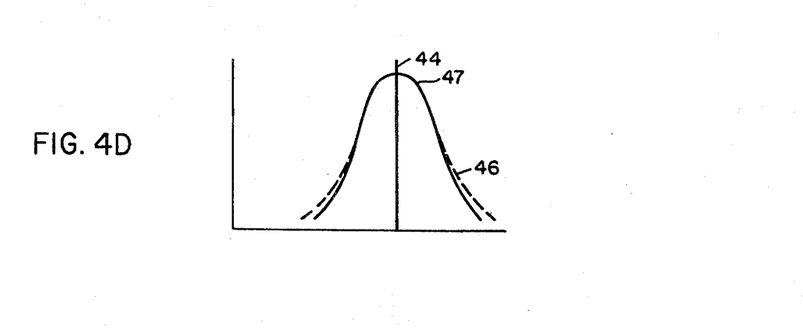
Figure 7:
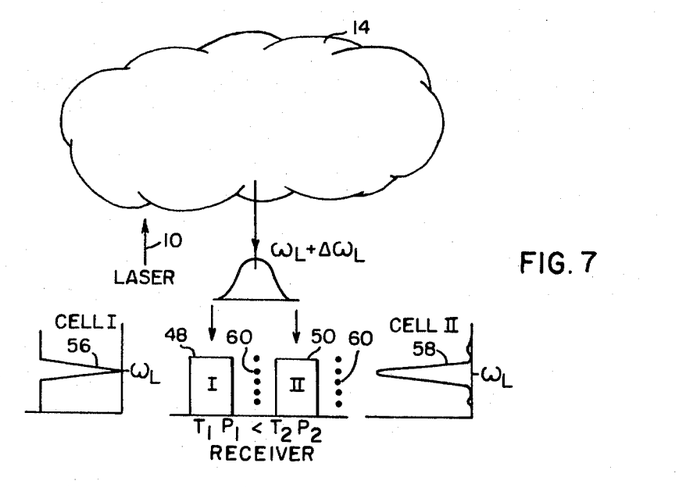
FIG. 7 is a schematic illustration of an exemplary receiver used to practice this invention.

In many applications, it will be desirable to establish, simultaneously, two types of measured data, viz. the density of the gas and the depth of the gas through which the beam propagates. There exist two methods based on frequency discrimination which will accomplish this. In the first of the frequency methods the data processor 28 plots the received beam as a function of frequency defining the spectral profile of the backscattered radiation as illustrated in FIGS. 4A, B, C, and D. The spectral width of the laser 44 is very narrow, or can be made very narrow compared to the spectral profile 46 of the molecular species as illustrated in FIG. 4A. The width of the spectral profile from the molecular constituents in the atmosphere is due mainly to collision broadening. In a single scattering process, the reradiated light has essentially the same frequency as the laser. Thus, it may be expected that the light scattered from the layer of initial penetration has still essentially the same spectral profile as the laser radiation, as shown by reference character 47 in FIG. 4B. However, the light from deeper layers of penetration of the primary laser beam undergoes many capture and reemission processes. During each process (depending on its duration compared to the period the molecule is free from perturbation), there takes place a certain average amount of detuning of the original frequency. The reemitted light is therefore quite broadened depending upon the extent of resonance imprisonment which will be a function of depth and density of the molecular species within the gaseous medium 14 as may be observed from the graphic shown in FIGS. 4C and 4D. If the density of the molecular component is very small (single scattering), the scattered radiation has substantially the profile of the incident laser beam (assuming there is not vibrational relaxation). For densities large enough for the onset of resonance imprisonment, the light undergoes several capture processes and the scattered light begins to be broadened as illustrated in FIG. 4C. For high densities, the scattered radiation approaches the molecular line shape as illustrated in FIG. 4D. The ratio of the intensity of the received scattered light with a frequency in the wings of the molecular line (measured at a preselected frequency deviation from the incident laser frequency, the exact deviation is not important so long as the deviation employed is used consistently) to that in a narrow interval around the laser frequency is a measure of the dnesity and depth of the molecular species being detected. FIG. 7 illustrates an exemplary system for measuring this ratio. The backscattered light is observed through two filters 48 and 50 which may be adjacent to each other as shown (division of wavefront) or share the incident power by means of a beam splitter (division of amplitude). The filters 48 and 50 serve as the discriminator 32 illustrated in FIG. 5. One filter 48 transmits only the line portion outside of the center illustrated by curve 56; the other 50 only the portion near the center illustrated by curve 58. The ratio of the signals received through the two filters is then a measure of the gas density and depth. Since fine spectral spectroscopy is involved, the filters have to be constructed with some care. One simple method is to use gas cells containing the gas or gas mixtures to be investigated. In the first cell 48, the gases are held at lower temperature and pressure so as to absorb a sharp central portion. In the second cell 50, the gases are held at higher pressure and temperature, and preferably, in a longitudinally magnetic field 60 so that the lines are split, the central portion passed, but the portion outside the center largely absorbed by broadened (Zeeman) shifted lines. This ratio, labeled R for convenience, together with the graphical results obtained in the time domain may be correlated to determine the density and depth of the gaseous molecular species under detection. This method may be repeated for each gaseous molecular species of interest to determine its presence, density and depth along the axis of incident radiation.

Figure 8:
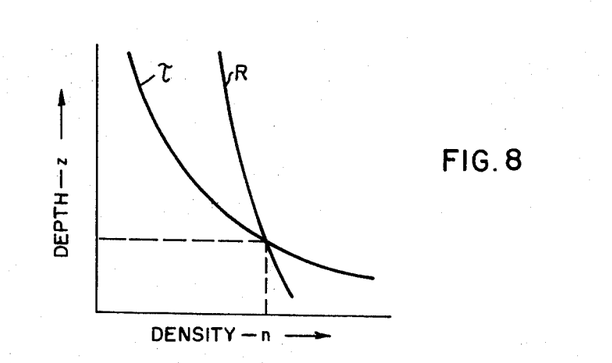
FIG. 8 is a graphical illustration of a standard curve which may be used to correlate the results of this invention.

The correlation between the time and frequency data can be understood in the following way. The two unknowns are density n and thickness (or depth) $z$ of the gas. For a given effective cross area of the laser beam, the product $nz$ measures the total number of molecules N encountered by the beam. Assume first, for simplicity, that the received pulse width in the time domain, $\tau = T_2 - T_1$, depends only on the total number N of the gas encountered by the laser beam and that the ratio R, defining the spectral width, depends only on the density $n$. In this case, the two measurements define uniquely and separately, the density $n$, the total number N and the depth $z$. In most situations, this simplification holds true only approximately. This is schematically illustrated in FIG. 8. For a given measured time width $\tau$, the possible combination of values $n$ and $z$ is given by a curve (indicated by $\tau$) which is only approximately a hyperbola defined by the condition that nz equals a constant which is a measure of the total number N. Similarly, the measurement of R does not determine uniquely the density n alone (which case would be represented by a vertical line in FIG. 8), but depends to a lesser extent also on depth $z$. However, the intersection between the two curves does determine $n$ and $z$ separately.

Thus, by calibration, a family of curves $z$ vs. $n$ with various values of $\tau$ as a parameter and another family of curves $z$ vs. $n$ with various values of R as a parameter superposed thereon, can be prepared. Such a chart uniquely defines density and depth for any combination of time and frequency domain measurements. The computer programming of such a chart is well within the state of the art so that a real-time readout is possible with this method. Where an accurate measure of density is not required these curves may be used separately in connection with the frequency and time responses received from the method taught by this invention to give a measure of density.

The number $nz$ can also be determined by fine tuning the laser frequency around the maximum of resonance as previously described. At higher densities, the echo returned has a saturation value $I_o$ in intensity, due to the fact that under these conditions very little radiation is capable of penetrating into deeper layers. However, sufficient detuning will permit deeper penetration. For a certain frequency deviation (illustrated by $\lambda_c$ in FIG. 9) from the center of resonance, the backscattered intensity will begin to fall off from the saturation value. This deviation is therefore a measure of the total number N of the scattering molecules. Combined with one of the measurements previously described, the density $n$ and depth $z$ can then be obtained separately. This is accomplished by calibrating a family of curves with $\lambda_c$ as a variable in a manner similar to that previously described.

Figure 6:
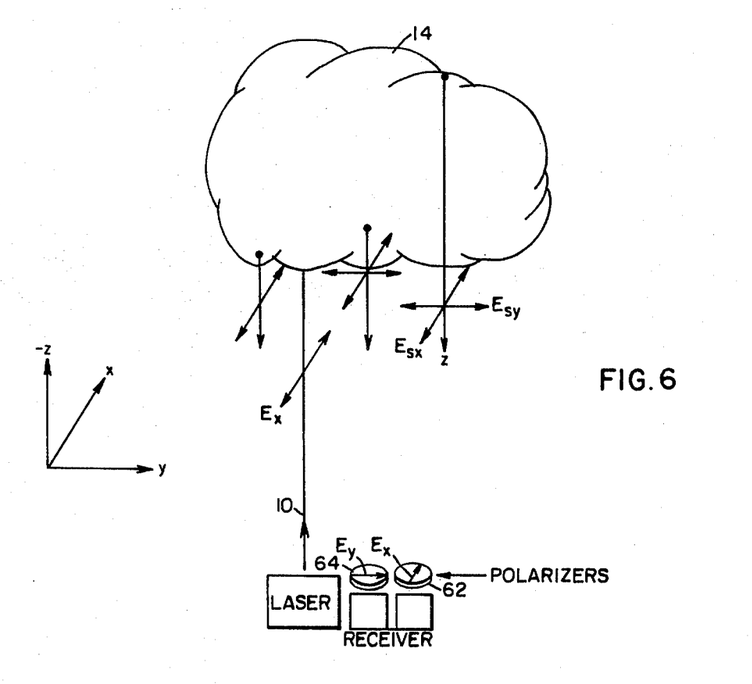
FIG. 6 is a schematic illustration of an exemplary receiver setup to detect the polarized backscattered light.

A further diagnostic method contemplated by this invention utilizes the depolarization that occurs in processes such as resonance imprisonment. As illustrated in FIG. 6 a laser beam 10 is pointed toward the resonant medium 14 in the z direction, linearly polarized in the $x$ direction ($E_x$). The backscattered light is observed by two adjacent receivers 62 and 64 admitting only the $x$ and $y$ component, respectively. The ratio of the corresponding intensities, the "depolarization" $I_y/I_x$ reveals information on the monitored volume of gas under detection. If the resonance corresponds to a vibrational-rotational line of a molecule, typically in the infrared region, depolarization is almost complete (i.e. $I_y/I_x \approx 1$) for all but very small densities. The depolarization may, therefore, serve by itself in the infrared region as a means of discriminating against echoes from aerosols or surfaces which produce much less, if any, depolarization. On the other hand, if the resonance corresponds to the electronic transistion of a single atom, typically in the ultraviolet or visible region, the individual scattering process occurs so fast that the atom has little probability of depolarization. Only a succession of scattering processes such as they occur in resonance imprisonment will cumulatively build-up a correspondingly large depolarization. Thus, for such transitions, the ratio $I_y/I_x$ can be used as a measure of density by comparing the received ratio with a precalibrated standard. Between these two extremes, there exist intermediate conditions, such as electronic transitions of molecules, for which the depolarization method can be used to aid in the diagnostic process taught by this invention by identifying the molecules of interest within the gas distribution. The polarization method, thus described, has the advantage of being insensitive to the frequency of the received resonance lines. Thus, requiring only one detector for all absorption frequencies. The depolarization $I_y/I_x$ may then be compared with a standard prepared in a similar manner to that previously described, to determine the identity and density of the molecular species being detected.

Thus, the methods described as being within the contemplation of this invention have the advantage of being able to discern the molecular composition of a remote gaseous medium in real time during either day or night. The identity and concentration of a particular molecular species can be determined in any volume element, even it it appears as a point source within the direct viewing range of the laser platform. Similarly, the density and size distribution of particles of smoke or aerosol can be established with the same system along with gas monitoring.

I claim as my invention:

1. The method of remotely monitoring a gas distribution comprising the steps of:

exclusively irradiating the gas distribution with monochromatic laser radiation of a wavelength which substantially coincides with one of the natural absorption lines of at least one gas molecular species to be detected to optimize the process of resonance imprisonment occurring within the distribution;

positioning a receiver substantially proximate to said laser to view the backscattered radiation from the irradiated region of the gas distribution;

converting the signal viewed by said receiver into a frequency spectrum;

taking the ratio of the amplitude of the spectral lines in said spectrum with frequencies in the wings of the central spectral line to that in a narrow interval around the laser frequency; and correlating said ratio as a measure of the gaseous density of the gas molecular species detected.

2. The method of claim 1 wherein said correlating step comprises comparing said ratio to a known standard to determine a measure of the gaseous density of the gas molecular species detected.

3. The method of claim 1 including the steps of:

detecting signals in said receiver as a function of time;

measuring the delay between the transmission of said laser radiation and the receivers encounter of the backscattered radiation; and calculating the range of the detected gaseous molecular species from said delay.

4. The method of claim 3 wherein said correlating step comprises comparing said time signal to said ratio to determine the molecular density and depth along the axis of incident laser radiation of the gas molecular species detected.

5. The method of remotely monitoring a gas distribution comprising the steps of:

exclusively irradiating the gas distribution with monochromatic laser radiation of a wavelength which substantially coincides with one of the natural absorption lines of at least one gas molecular species to be detected to optimize the process of resonance imprisonment occurring within the distribution;

positioning a receiver substantially proximate to said laser to view the backscattered radiation from the irradiated region of the gas distribution;

converting the signal viewed by said receiver into a frequency spectrum;

detuning the laser radiation around the natural absorption line of the detected gas molecular species to a wavelength that reduces the received signal to a set fraction of the incident laser radiation; and correlating said detuned wavelength to determine the presence of the detected molecular species within the monitored gas distribution and as a measure of the gaseous density of the detected molecular species.

6. The method of claim 5 wherein said correlating step comprises:

taking the difference between the natural absorption wavelength and said detuned wavelength; and comparing said difference with a known standard to determine a measure of the gaseous density of the gas molecular species detected.

7. The method of claim 5 including the steps of:

detecting signals in said receiver as a function of time;

measuring the delay between the transmission of said laser radiation and the receivers encounter of the backscattered radiation; and calculating the range of the detected gaseous molecular species from said delay.

8. The method of claim 7 wherein said correlating step comprises comparing said time signal to said detuned wavelength to determine the molecular density and depth along the axis of incident laser radiation of the detected gas molecular species.

9. The method of remotely monitoring a gas distribution comprising the steps of:

exclusively irradiating the gas distribution with monochromatic laser radiation of a wavelength which substantially coincides with one of the natural absorption lines of at least one gas molecular species to be detected to optimize the process of resonance imprisonment occurring within the distribution;

positioning a receiver substantially proximate to said laser to view the backscattered radiation from the irradiated region of the gas distribution;

detecting signals in said receiver as a function of time;

determining from said time signal the presence of the detected gas molecular species within the monitored gas distribution;

converting the signal from the receiver into a frequency spectrum;

taking a ratio of the amplitude of the spectral lines in said spectrum with frequencies in the wings of the central spectral line to that in a narrow interval around the laser frequency; and correlating said time signal to said ratio to determine the molecular density and depth along the axis of incident laser radiation of the gas molecular species detected.

10. The method of remotely monitoring a gas distribution comprising the steps of:

exclusively irradiating the gas distribution with monochromatic laser radiation of a wavelength which substantially coincides with one of the natural absorption lines of at least one gas molecular species to be detected to optimize the process of resonance imprisonment occurring within the distribution;

positioning a receiver substantially proximate to said laser to view the backscattered radiation from the irradiated region of the gas distribution;

detecting signals in said receiver as a function of time;

determining from said time signal the presence of the detected molecular species within the monitored gas distribution;

converting the signal from the receiver into a frequency spectrum;

detuning the laser radiation around the natural absorption line of the detected gas molecular species to a wavelength that reduces the received signal to a set fraction of the incident laser radiation; and correlating said time signal to said detuned wqvelength to determine the molecular density and depth along the axis of incident laser radiation of the gas molecular species detected.

* * * * *